United States Patent [19]

Buchanan, Jr.

[11] Patent Number: 5,644,180
[45] Date of Patent: Jul. 1, 1997

[54] REAR MOTOR BEARING FOR WORM GEAR DRIVE MOTORS

[75] Inventor: Harry C. Buchanan, Jr., Spring Valley, Ohio

[73] Assignee: ITT Automotive Electrical Systems, Inc., Auburn Hills, Mich.

[21] Appl. No.: 469,520

[22] Filed: Jun. 6, 1995

[51] Int. Cl.$^6$ .................................................. H02K 15/14
[52] U.S. Cl. ........................... 310/90; 310/91; 384/296; 384/372
[58] Field of Search ................... 310/90, 91; 384/296, 384/379, 396

[56] References Cited

U.S. PATENT DOCUMENTS

| | | | |
|---|---|---|---|
| Re. 34,667 | 7/1994 | Neumann | 310/216 |
| 2,975,649 | 3/1961 | Propst | 74/424.8 |
| 3,068,713 | 12/1962 | Davis | 74/424.8 |
| 3,068,714 | 12/1962 | Davis | 74/459 |
| 3,302,477 | 2/1967 | Grabowski | 74/424.8 |
| 3,333,484 | 8/1967 | Young | 74/424.8 |
| 3,476,966 | 11/1969 | Willyoung | 310/270 |
| 3,855,486 | 12/1974 | Binder et al. | 310/49 |
| 3,937,097 | 2/1976 | Fund et al. | 74/424.8 |
| 4,227,104 | 10/1980 | Hamman | 310/75 R |
| 4,258,584 | 3/1981 | Haegele et al. | 74/424.8 |
| 4,400,639 | 8/1983 | Kabayashi et al. | 310/215 |
| 4,780,632 | 10/1988 | Murray, III | 310/111 |
| 4,823,032 | 4/1989 | Ward et al. | 310/43 |
| 4,839,552 | 6/1989 | Takaba | 310/268 |
| 4,868,436 | 9/1989 | Attilio et al. | 310/67 R |
| 4,887,480 | 12/1989 | Pollo | 74/459 |
| 4,920,289 | 4/1990 | Saito | 310/90 |
| 4,972,113 | 11/1990 | Newberg | 310/217 |
| 5,006,747 | 4/1991 | Stewart, Sr. | 310/239 |
| 5,008,572 | 4/1991 | Marshall et al. | 310/45 |
| 5,010,266 | 4/1991 | Uchida | 310/156 |
| 5,049,771 | 9/1991 | Challita et al. | 310/219 |
| 5,068,556 | 11/1991 | Lykes et al. | 310/90 |
| 5,068,557 | 11/1991 | Murugan | 310/90 |
| 5,087,847 | 2/1992 | Giesbert et al. | 310/90 |
| 5,088,362 | 2/1992 | Schalles | 82/142 |
| 5,113,114 | 5/1992 | Shih et al. | 310/270 |
| 5,128,571 | 7/1992 | Itsu | 310/67 R |
| 5,144,738 | 9/1992 | Oyafuso | 29/596 |
| 5,296,773 | 3/1994 | El-Antably et al. | 310/261 |
| 5,321,328 | 6/1994 | Ide | 310/90 |
| 5,325,736 | 7/1994 | Tsujita | 74/425 |
| 5,357,160 | 10/1994 | Kaneda et al. | 310/67 R |
| 5,394,043 | 2/1995 | Hsia | 310/90 |
| 5,485,044 | 1/1996 | Mackay et al. | 310/90 |
| 5,517,070 | 5/1996 | Schmidt | 310/89 |

FOREIGN PATENT DOCUMENTS

| | | |
|---|---|---|
| 1566801 | 5/1969 | France . |
| 1477179 | 3/1969 | Germany . |
| 347680 | 8/1960 | Switzerland . |
| 9427045 | 11/1994 | WIPO . |

*Primary Examiner*—Steven L. Stephan
*Assistant Examiner*—Nicholas Ponomarenko
*Attorney, Agent, or Firm*—J. Gordon Lewis, Esq.; Thomas N. Twomey, Esq.

[57] ABSTRACT

An electric motor, such as a motor for operating a worm drive, has a rear bearing and rear bearing support in the form of a sleeve bearing which is received within a rearwardly facing axial opening formed in the end of the motor armature shaft. The bearing receives one end of a non-rotating pin which has its opposite end secured to the rear end wall of the motor and thus supports the armature shaft on the end wall. Minor misalignments are provided for by aligning movements of the bearing support pin accompanied by slight bending of the end wall of the motor case. In another embodiment, the pin is provided with a spherical end received within a conforming or mating recess and providing for pivotal aligning movement of the bearing support pin with respect to the motor case. The bearing may also be shouldered or flanged so that thrust forces on the shaft are transmitted to an adjacent shoulder on the bearing support pin.

6 Claims, 2 Drawing Sheets

REAR MOTOR BEARING FOR WORM GEAR DRIVE MOTORS

BACKGROUND OF THE INVENTION

The rear bearings for most worm gear electric drive motors, such as used in large quantity in the automotive field for operating window lifts, sun roofs, seat positioners, mirrors, and the like, are generally designed for loads that greatly exceed the actual requirements of such drive motors. Therefore, the bearing supports and bearings are overrated and result in an unnecessary increase in the cost of production of electric drive motors for worm drive assemblies.

A further cost factor, typical of worm drives, is the fact that the rear motor bearing must provide a self-aligning function. Since the self-aligning bearing itself must be free to move within the rear motor case or housing, complementary semi-spherical surfaces are provided for the common sleeve-type bearing which surfaces must be matched respectively in the bearing support end wall, thereby increasing the production cost. Also, since the bearing must be free to move or align itself, a retainer is required since it is not possible simply to press fit the bearing into place in the motor case.

A need therefor exists for a dependable, easy-to-fabricate, low cost, and adequate bearing support for the rear bearings for worm drive motors or similar motors which represent a cost savings, which is easier and less expensive to make, of less complexity, and with inherent self-alignment capability.

SUMMARY OF THE INVENTION

The above objects are accomplished, in this invention, by providing a low-cost bearing which is received, such as by press fitting, into an axial recess centrally formed in the rear end of the armature shaft, and bearing receives a non-rotating shaft in the form of a pin secured to the rear or end wall of the motor case. Since the case is formed of drawn metal, the shaft or pin can deflect slightly, in response to misalignment, accompanied by limited elastic deformation or bending of the rear motor wall.

In one modified form of the invention, the stationery bearing support pin, forming a bearing shaft, may be provided with a spherical head received and retained within a semi-spherical recess in the case rear wall. The spherical head permits the pin to be slightly rotated within the recess, as necessary, to compensate for alignment. In another modification, the sleeve bearing is provided with a flanged outer end providing for thrust loadings.

The rear bearing loading, in an electric motor worm drive, is defined by a force that is applied orthoganally to the axis of the armature shaft. This force is the result of the separation force which occurs between the worm drive on the armature shaft and the large output gear. In such drives, axial thrust is mainly carried by a thrust bearing in the motor front case.

The separation force between the worm and the gear is a function of the worm thrust and the gear tooth design. The actual bearing loading is relatively low, since the force is applied through a lever arm which represents the fixed spacing between the worm drive at the output gear, on the one hand, and the thrust bearing, on the other hand. This lever arm is generally short compared to the lever arm between the thrust bearing and the rear bearing, usually by a factor of about 1 to 3.

The maximum loading, for any installation, can be calculated for any pressure and speed, and the life of the bearing can be predicted. The concept of utilizing a bearing mounted within the recess in the armature shaft, and piloted on a non-rotating stub pin-like shaft, provides more than adequate service life for intermittent operating automotive and motor vehicle worm gear installations or other low loaded rear bearing-type motors.

It is accordingly an important object of this invention to provide a lower cost rear bearing support for worm drive motors.

A still further object of the invention is the provision of a rear bearing support, for an electric motor, in which a bearing is received within and secured to the armature shaft of the motor, and which bearing is piloted on a stationery support shaft carried on the motor rear case.

Another object of the invention is the provision of a rear bearing support, as outlined above, in which the bearing piloting shaft can move to compensate for misalignment through the bending of the motor case wall or through a pivotal connection between the wall and the support pin.

A further advantage of the invention resides in the fact that since the rear support bearing material is recessed within the armature shaft, the overall length of the drive motor may be correspondingly shortened, thus further reducing material costs and providing a capability of fitting the motor into smaller spaces.

Other objects and advantages of the invention will be apparent from the following description, the accompanying drawings and the appended claims.

BRIEF DESCRIPTION OF THE ACCOMPANYING DRAWINGS

DESCRIPTION OF THE PREFERRED EMBODIMENTS

Figure 1:
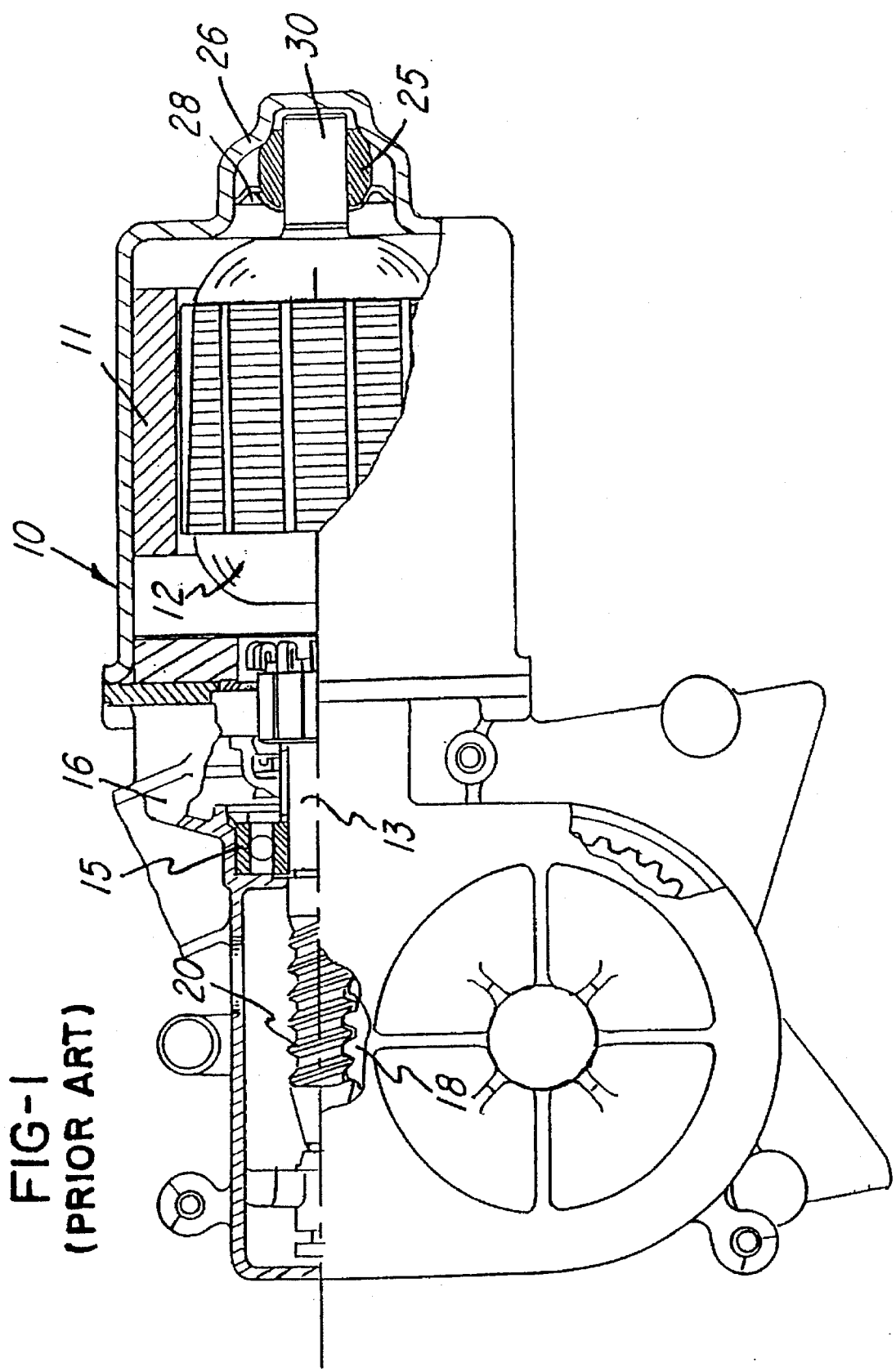
FIG. 1 is a sectional view of a typical prior worm drive having a conventional rear bearing support.

Referring first to FIG. 1 of the drawings which illustrates a prior art electric motor worm drive, a motor casing or housing 10 supports internal permanent field magnets 11 or other suitable magnet means, and a rotating armature 12. The armature 12 has an output shaft 13 carried through a thrust bearing 15 mounted in a Wear housing 16 for the bull gear or large gear 18 of the worm drive. The shaft 13 is provided with threads 20 which engage the threads of the gear 18 when the armature is rotated.

The rear bearing of the motor includes a self-aligning semi-spherical bearing 25 mounted within a rear extension 26 of the motor housing 10 and retained in place within the extension 26 by a retainer ring 28. The rear end 30 of the motor armature shaft is retained and supported within the bearing 25.

Typically, the bearing design is far in excess of the needs of a rear bearing support for a worm drive motor since the rear bearing load requirements are only those which can be transmitted to the bearing by the separation force between the drive worm or threads 20 and the gear 18. The axial trust is carried by the bearing 15.

Figure 2:
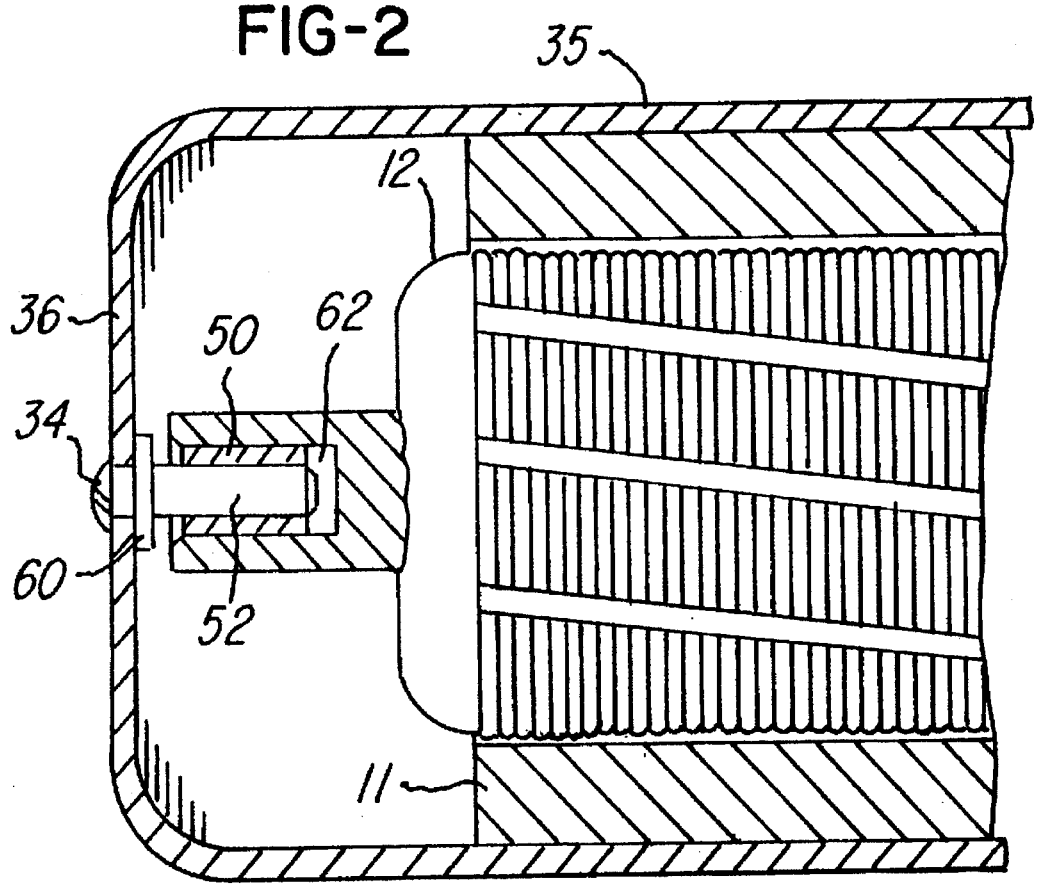
FIG. 2 is a sectional view of a rear bearing and support, according to this invention.

The bearing arrangement of this invention not only reduces the cost, but also reduces the overall length which is necessary for the motor housing 10 as shown in the fragmentary sectional view of FIG. 2. In FIG. 2, a metal motor housing case 35, which may be a deep drawn case, is formed with a rear wall 36. The armature shaft 40 (FIG. 4) has a rear end which is provided with an axially aligned cylindrical recess. The recess opens toward and faces the case end wall 36.

A cylindrical sleeve bearing 50 is press fitted within the recess 44 and therefore is formed with an outer surface which forms a close interference fit with the shaft 40.

The inside surface of the bearing 50 is piloted on one end of a shaft-supporting shaft or pin 52. The pin is relatively fixed or non-rotating, and the opposite end of the pin 52 is secured to the end wall 36 by any suitable attachment means, such as by radial riveting of the pin head, as shown at 34. The pin may be shouldered at 60 to form a stop against the inside wall of the case, thereby supporting the pin 52 in relatively fixed relation on the case, with the extended or free end thereof received within the bearing 50.

In most applications, a suitable sleeve bearing, one formed of DU material that is a PTFE/lead composite, designed and developed to be used a dry self-lubricating bearing material. If desired, auxiliary lubrication may be provided by a suitable felt or other means located within the spacing 62 located at the inner end of the recess 44 and the adjacent inner end of the bearing 50. Under suitable circumstances, other generally self-lubricating bearing materials may be used, such as sintered bronze. Also, small ball-type bearings may also be used.

Among the many advantages resides in the fact that overall motor length has been reduced, commensurate with the elimination of the length which had been occupied by the conventional self-aligning bearing as illustrated at 25 in FIG. 1. Further, the design of the case 35 is simplified as compared to that of the case 10 since there is no need to form a shaped bearing support recess which would permit self-aligning movement of the bearing. In the embodiment as shown in FIG. 2, limited aligning movements of the shaft supporting pin 52 are accomplished by small deflections of the motor rear wall 36 in response to alignment requirements for the pin.

The assembly cost may also be reduced as well, since automated machinery may be used to provide the armature recess, to insert the sleeve bearing, and to insert and fix the supporting pin 52 within the end wall.

Figure 3:
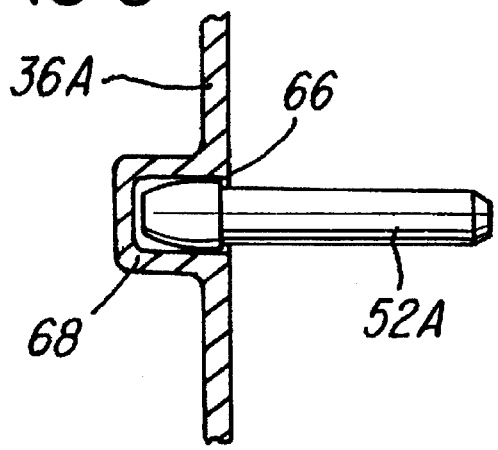
FIG. 3 is a modified form of the support of this invention.

Optionally, the modification as illustrated in FIG. 3 may be used for providing for self-alignment of the support pin where case deflection is not required or is not feasible. In that case, a pin 52A is provided with an integral spherical end 66 received within the conforming interior of a mating protrusion 68 formed on the rear wall of the case 36. In this manner, the pin 52A is captured and supported on the wall 36a while permitting limited self-aligning movement with respect to the rear wall.

Figure 4:
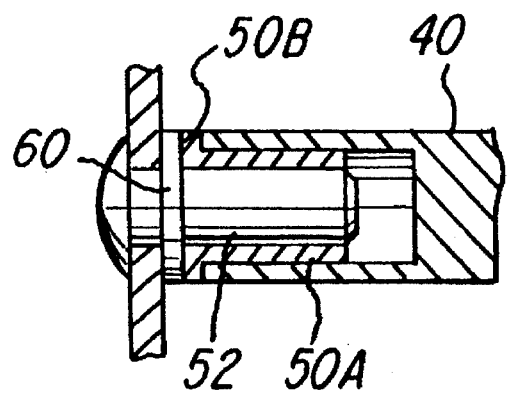
FIG. 4 is a further modification providing for thrust loading of the armature shaft.

The shaft and bearing assembly of this invention may be modified, as shown in FIG. 4, to permit the armature shaft 40 to carry thrust. For this purpose, the sleeve bearing 50 may be modified as shown at 50a in FIG. 4 with a generally radially extending flange 50b. The flange 50b is positioned at the end of the shaft 40 so that it may run in thrust abutment with the collar or shoulder 60 of the pin 52.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In an electric motor having an outer case forming a rear wall of the motor, and a rotating armature shaft therein with an end facing said rear wall, the improvement comprising an axial opening formed in said armature shaft end, a sleeve bearing in said opening having an outer surface in engagement with said armature shaft, and a shaft supporting pin having one end rotatably received in said sleeve bearing and having a remote end supported on said motor rear wall.

2. A shaft and bearing assembly for the support of an armature shaft of an electric motor for rotation with respect to a rear wall of the motor case; comprising an axial opening formed in the armature shaft and adjacent said rear case wall; a cylindrical sleeve bearing having an outer surface tightly fitted within said opening and having an inner shaft-receiving opening; and a bearing support shaft having a first end received within said shaft-receiving opening of said bearing and having a second end supported on said rear case wall.

3. The shaft and bearing assembly of claim 2, in which said bearing support shaft is movable by deflection of said case rear wall to provide for alignment of said armature shaft within said case.

4. The shaft and bearing assembly of claim 3, in which said bearing support shaft second end is formed with an integral spherical surface, and in which said case rear wall is formed with a recess receiving said shaft second end and providing for pivotal self-aligning movement of said bearing support shaft with respect to said case wall.

5. The shaft and bearing assembly of claim 2 in which said bearing support shaft is formed with a flange positioned adjacent an inside rear surface of said case wall, and in which said sleeve bearing is formed with a generally radially extending shoulder positioned exteriorly of said shaft between said shaft and said flange for transmitting thrust from said shaft to said motor rear case wall.

6. In an electric motor having an outer case forming a rear wall of the motor, and a rotating armature shaft therein with an end facing said rear wall, the improvement comprising an axial opening formed in said armature shaft end, and a bearing having an outer annular surface forming a close fit with said armature shaft opening thereby supporting said bearing within said opening for rotation with said shaft, said bearing further having a central opening, and a relatively fixed non-rotating pin having one end received in said bearing central opening for supporting said bearing thereon and having another end attached to and supported on said case rear wall.

* * * * *